United States Patent Office 3,794,609
Patented Feb. 26, 1974

3,794,609
CHEMICAL RESISTANT EPOXY COMPOSITIONS CAPABLE OF ROOM TEMPERATURE CURING
Ignatius Metil, Buffalo, N.Y., assignor to Ameron, Inc., Brea, Calif.
No Drawing. Continuation of application Ser. No. 4,462, Jan. 19, 1970, which is a continuation of application Ser. No. 688,332, Dec. 6, 1967, both now abandoned. This application Sept. 22, 1972, Ser. No. 291,337
Int. Cl. C08g 51/34, 51/28, 51/26
U.S. Cl. 260—30.4 EP      25 Claims

ABSTRACT OF THE DISCLOSURE

A room temperature cured reaction product of a resinous epoxide, a polyfunctional organic solid amine effective alone only as a high temperature curing agent for the resinous epoxide, and a solvent for the curing agent in sufficient amount to modify the action of the curing agent and allow room temperature curing to a cross-linked product possessing adequate physical properties and having chemical resistance properties comparable to that degree of chemical resistance normally associated only with resinous epoxide-amine reaction products, cured at elevated temperatures.

CROSS REFERENCE TO RELATED APPLICATIONS

This application is entitled under 35 USC 120 as to the invention herein to the filing date of my prior application Ser. No. 688,332, filed Dec. 6, 1967 and now abandoned, the present application being a continuation of my prior application Ser. No. 4,462, filed Jan. 19, 1970 and now abandoned and which application Ser. No. 4,462 was a continuation of said application Ser. No. 688,332 and was similarly entitled under 35 USC 120 to said filing date of Dec. 6, 1967 for said invention.

BACKGROUND OF THE INVENTION

The reaction products of a resinous epoxide, with amines to provide such materials as adhesives, films, casting cements, brick and tile cements, laminates, floor toppings, highway surfacings, impregnated products and the like, may be broadly classed as room temperature cured products and products requiring an elevated temperature environment to effect cure. In the former type it may be stated generally that, as compared to those cured at elevated temperature, the mechanical properties and chemical resistance are somewhat inferior.

The amine compounds used for room temperature curing are specifically different from the amine compounds used for elevated temperature curing, the latter being ineffective or at least inefficient for use as room temperature curing, the resultant products either remaining in a plastic, largely uncured state, or if cured sufficiently to harden, then woefully lacking in mechanical strength and chemical resistance.

BRIEF SUMMARY OF THE INVENTION

The present invention is directed to resinous epoxide products cured at room temperature which possess vastly superior chemical resistance as compared with conventional resinous epoxide products cured at room temperature, their chemical resistance being of the kind which normally is associated only with products cured at elevated temperatures.

The hardeners or curing agents used in connection with this invention are solid, polyfunctional amines in which the nitrogen atoms of the amine groups are attached to carbon atoms of cyclic compounds, being in general the type normally used only at elevated temperature as hardeners for resinous epoxides. It has been found that stoichiometric amounts of these hardeners effectively may be used as room temperature curing agents to yield epoxide products possessing high degree of chemical resistance if they are used in the presence of a liquid solvent for the curing agents in an amount sufficient to modify the action of the amine hardener and effect cure at room temperature. The requisite amount of solvent-modifier is about 1% to about 50% by weight of the resinous epoxide. Surprisingly, these solvent-modifiers may be either reactive or nonreactive with the resinous epoxide-hardener combination, it being preferred, however, to use a reactive modifier for the reason that the curing time is accelerated as compared to the use of nonreactive modifiers and because reaction occurs between the modifier, resinous epoxide and hardener.

DETAILED DESCRIPTION OF THE INVENTION

The polyfunctional solid amine curing agents or hardeners of this invention are characterized by two or more primary or secondary amino nitrogens attached to cyclic carbon atoms, as exemplified by such aromatic compounds as metaphenylene diamine, p,p'-methylene dianiline, p,p'-diaminodiphenyl oxide or by amino nitrogens as aforesaid attached to carbon atoms of other cyclic compounds such as are exemplified by dodecahydro-1,4,7,9b-tetraazaphenalene.

Eutectic mixtures of these polyfunctional amines are also functional in and applicable to this invention.

Reactive modifying solvents applicable to the invention are ethers, as exemplified by butyl glycidyl ether, phenyl glycidyl ether, cresyl glycidyl ether and allyl glycidyl ether; alcohols, as exemplified by isopropyl alcohol, benzyl alcohol, furfuryl alcohol; derivatives of furfuryl alcohol, as exemplified by tetrahydrofurfuryl alcohol and furfuryl alcohol polymer; and low viscosity organic solvents for the curing agent containing epoxy groups, as exemplified by styrene oxide, propylene oxide and epichlorohydrin. The nonreactive modifiers applicable to this invention are organic solvents for the curing agent or hardener, as exemplified by such compounds as methyl isobutyl ketone, acetone as well as petroleum hydrocarbons.

The resinous epoxides of this invention are those resinous epoxides conventionally employed for both room temperature and elevated temperature curing and may be of aliphatic, cycloaliphatic and aromatic types.

Specifically, the resinous epoxides useable in connection with the present invention are exemplified by the following general structural formulas:

Type I(a)

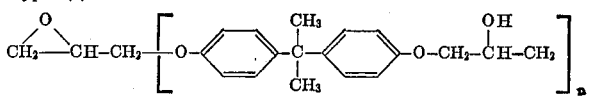

(b)

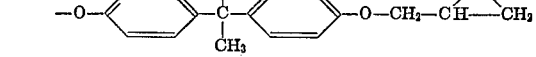

Type II

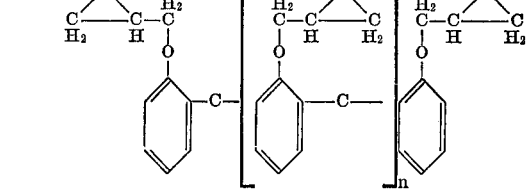

Type III(a)

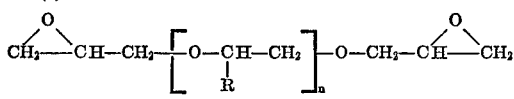

(b)

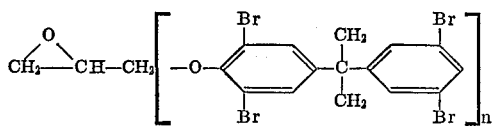

(c)

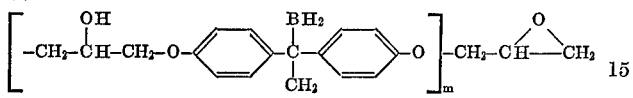

Type IV(a)     (b)

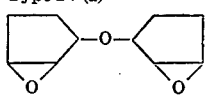     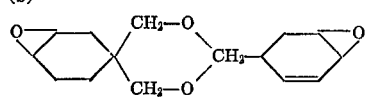

The following examples are given as illustrative of the invention rather than as limitative thereof:

EXAMPLE 1

Cylindrical compression specimens were prepared according to ASTM C 579–65T from each of the following composition, cured at 75±5° F. and tested for compressive strength after 3 days cure. The working time, initial setting time and exotherm were recorded from the initial mix at 75±5° F. The filler was employed to assure uniformity of test specimens. The epoxide resin is of the epichlorohydrinbisphenol A type, having a viscosity of 19,000 cps. (25° C.), an epoxide equivalent of approximately 209 and the structural formula represented as Type 1 in FIG. 1. The working time was determined according to ASTM C 308–64. The initial setting time was determined on a one-half inch deep patty specimen of each composition by recording the time in hours at which the indentation of a Vicat needle is less than 1 mm. using a Humboldt penetrometer. Exotherm determinations were conducted by recording the maximum temperature attained with a thermometer suspended in the center of each composition.

FORMULATIONS

Liquid component (I)

Resin: Epoxy—80 parts
Solvent-modifier: Furfuryl alcohol—20 parts (II)

Epoxy—80 parts
Tetrahydrofurfuryl alcohol—20 parts (III)

Epoxy—80 parts
Furfuryl alcohol polymer—20 parts

Powder component (A)

Aggregate: Sand—300 parts
Filler: Barium sulfate—80 parts
Hardener: Metaphylene diamine—11 parts (B)

Sand—300 parts
Barium sulfate—80 parts
Methylenedianiline—20 parts (C)

Sand—300 parts
Barium sulfate—80 parts
Dodecahydro-1,4,7,9b-tetraazaphenalene—24 parts (D)

Sand—200 parts
Fine silica filler—100 parts
p,p′-Diaminodiphenyl oxide—22 parts

TABLE I.—FORMULATION

| Liquid component | Powder component | Working time, pot life (hrs.) | Initial setting time (hrs.) | Maximum exotherm (° F.) | Compressive strength (p.s.i.) |
|---|---|---|---|---|---|
| I   | A | 4 to 5     | 8 to 9    | 90 | 11,140 |
| II  | A | 9 to 10    | 15 to 16  | 80 | 12,960 |
| III | A | 2½ to 3½   | 14 to 15  | 78 | 10,990 |
| I   | B | 5 to 6     | 8 to 9    | 90 | 10,860 |
| II  | B | 11 to 12   | 24        | 80 | 12,100 |
| III | B | 2½ to 3½   | 14 to 15  | 78 | 14,490 |
| I   | C | 1 to 1½    | 7 to 8    | 89 | 9,210 |
| II  | C | 4 to 5     | 10 to 11  | 86 | 9,395 |
| III | C | ½ to ¾     | 8½ to 9½  | 78 | 11,880 |
| I   | D | 7 to 8     | 11 to 12  | 86 | 8,935 |

All ten formulations representing three different reactive solvent-modifiers for the curing agent and four separate solid amines cured hard after 24 hours at room temperature and developed a strong bond to concrete, quarry tile and brick.

EXAMPLE II

A cured system employing an epoxy novolac resin having a viscosity of 30,000 cps. (125° F.), an epoxide equivalent of approximately 180 and the structural formula represented as Type II in FIG. 1 was prepared, cured and tested in the same manner outlined in Example I.

FORMULATION

Liquid component

Resin: Epoxy—75 parts
Solvent-modifier: Furfuryl alcohol—25 parts

Powder component

Aggregate: Sand—200 parts
Filler: Powdered silica—80 parts
Hardener: Methylene dianiline—20 parts

TABLE I

Working time (pot life), hrs. ------------------ 2–2½
Initial setting time, hrs. -------------------- 7½–8½
Exotherm, ° F. --------------------------- 88
Compression, p.s.i. ---------------------- 9,140

The above formula cured hard after 24 hours at ambient temperature and developed a strong bond to concrete, quarry tile and brick.

EXAMPLE III

A composition was prepared utilizing an aliphatic polyglycol epoxy resin having a viscosity of 45 cps. (25° C.), an epoxide equivalent weight of approximately 190 and a structure similar to that represented as Type III, FIG. 1. Both components were mixed at 75° F. and the composition, 180 grams, allowed to cure at ambient temperature.

FORMULATION

Powder

Fine silica filler—142.9 parts
Methylene dianiline—7.1 parts

Liquid

Epoxy—25 parts
Furfuryl alcohol—5 parts

Mixing ratio: 5 parts powder to 1 part liquid by weight.

The comopsition exhibited an initial setting time of approximately 72 hours. After 4 weeks cure at room temperature the set mass exhibited a Barcol hardness of 17 and compressive strength of 1,940 p.s.i.

EXAMPLE IV

A composition was prepared utilizing a cycloaliphatic epoxy resin having a viscosity of 7.8 cps. (20° C.), and epoxide equivalent weight of approximately 75 and a structure similar to that represented as Type IV, FIG. 1. Both components were mixed at 76° F. and the composition, 230 grams, allowed to cure at ambient temperature.

FORMULATION

Powder

Fine silica filler—183.2 parts
Methylene dianiline—16.8 parts

Liquid

Epoxy—25 parts
Furfuryl alcohol—5 parts

Mixing ratio: 20 parts powder to 3 parts liquid by weight.

The composition exhibited an initial setting time of approximately 72 hours. After 4 weeks cure, the set mass had a Barcol hardness of 84 and a compressive strength of 10,900 p.s.i.

EXAMPLE V

Chemical resistance of the present invention was conducted according to ASTM C 276–64 Chemical Resistance of Mortars, and calculated in accordance with Section 9(b). The one exception being that Group B was cured at higher temperature. The epoxide resin employed is the same as given in Example I.

FORMULATION

Powder

Sand—75%
Fine filler—19.5%
Methylene dianiline—5.5%

Liquid

Epoxy—90%
Furfuryl alcohol—10%

Mixing ratio: 4 parts powder to 1 part liquid by weight.

Conditioning test specimens:

Group A cure for 7 days at 75±5° F.
Group B cure for 2 hours at 160° F. and 1 hour at 300° F. followed by 7 days at 75±5° F.

Compressive strength after conditioning period:

Group A—16,392 p.s.i.
Group B—21,327 p.s.i.

ONE MONTH CHEMICAL IMMERSION AT 75±5° F.

| Chemical | Group A Compressive strength, p.s.i. | Group A Percent change in compressive strength | Group B Compressive strength, p.s.i. | Group B Percent change in compressive strength |
|---|---|---|---|---|
| 100% acetic acid | 16,486 | +0.5 | 21,197 | −0.6 |
| Concentrated lactic acid | 16,142 | −1.5 | 19,958 | −6.4 |
| 10% hydrochloric acid | 14,773 | −9.9 | 18,262 | −14.4 |
| 25% nitric acid | 15,262 | −6.9 | 18,751 | −12.1 |
| Ethyl alcohol | 15,849 | −3.3 | 21,262 | −0.3 |
| Trichloroethylene | 15,392 | −6.1 | 21,392 | 0 |

NOTE.—All specimens, after total immersion, were rigid, showing no sign of attack.

EXAMPLE VI

A composition was prepared utilizing an epoxy resin as described in Example I with a nonreactive solvent-modifier for the curing agent. The solvent-modifier is an aromatic with alkyl side chains derived from a petroleum hydrocarbon oil. Specimens were prepared and conditioned as described in Example I, and tested for compressive strength. The initial setting time was determined as described in Example I for 100 grams material cured at ambient temperature.

FORMULATION

Powder

Sand—60%
Fine silica filler—35%
Methylene dianiline—5%

Liquid

Epoxy—75%
Solvent-modifier—25%

Mixing ratio: 1 part powder to 1 part liquid by weight.
Compressive strength, 3 days at 75±3° F.—9430 p.s.i.
Initial setting time, at 75±3° F.—48 hours.
Composition was hard, rigid set mass after 3 days cure.

EXAMPLE VII

The chemical resistance of two-components solid aromatic amine cured epoxy system as compared to a conventional three-component polyamide room temperature cured epoxy system. This comparison was conducted according to ASTM C 267–64 Chemical Resistance of Mortars and calculated in accordance with Section 9(b). The epoxide resin employed was the same as given in Example I.

FORMULATION

Two-component system

Powder:
  Silica aggregate—12.0%
  Sand—79.5%
  Fine silica filler—5.0%
Liquid:
  Epoxy—74.5%
  Furfuryl alcohol—15.3%
  Epoxy pigmented paste—10.2%

Mixing ratio: 6 parts powder to 1 part liquid by weight.

Three-component system

Resin Component A:
  Epoxy—81%
  Butyl glycidyl ether—19%
Hardener Component B:
  Epoxy pigmented paste—15%
  2,4,6-tri(dimethylamino ethyl) phenol—24.5%
  High viscosity polyamide—13.3%
  Low viscosity polyamide—46.4%
Filler Component C:
  Sand—95%
  Fine Silica filler—5%

Mixing ratio: 5 parts "A" to 1 part "B" to 30 parts "C" by weight.
Conditioning test specimens: cure for 7 days at 75±5° F.
Compression strength after conditioning period:
  2-component system—12,123 p.s.i.
  3-component system—10,191 p.s.i.

TWO-MONTH CHEMICAL IMMERSION

| Temperature and chemical | Two-component aromatic amine cured Compressive strength, p.s.i | Two-component aromatic amine cured Percent change in compressive strength | Three-component polyamide cured system Compressive strength, p.s.i. | Three-component polyamide cured system Percent change in compressive strength |
|---|---|---|---|---|
| 25% acetic acid at 160° F | 9,236 | −23.8 | (1) | |
| 18% hydrochloric acid at 160° F | 10,924 | −9.9 | 2,834 | −72.2 |
| Concentrated oleic acid at 160° F | 18,631 | +53.7 | (1) | |
| Tetrachloroethane | 12,420 | +2.9 | (1) | |
| Ethyl alcohol | 10,510 | −13.3 | (1) | |
| 85% phosphoric acid at R.T | 13,090 | +8.0 | 10,860 | +6.6 |
| 10% chromic acid at R.T | 6,624 | −45.4 | 3,777 | −62.9 |

[1] Specimen fell apart.

EXAMPLE VIII

Solutions were prepared representing epoxy resins as given in Examples I and II, solid methylene dianiline hardener and various types of solvent-modifiers to illustrate a liquid-liquid system. The stoichiometric amount hardener, pulverized between 80 to 100 mesh size, was first dissolved in the solvent-modifier and then this solution was thoroughly blended into the epoxy resin at room temperature. The initial setting tiem and maximum exotherm exotherm were determined and recorded according to the procedure described in Example I. The pot life was recorded as terminated when the composition became difficult to stir with a spatula. The hardness of each cured composition was determined by employing a Barcol Impressor No. 935, after 7 days cure at room temperature on ⅜ inch clear cast specimens.

General formula:
  Epoxy resin—80 parts
  Modifier—20 parts
  Methylene dianiline (MDA)—stoichiometric amount

TABLE I

| Formula | Pot life | Initial cure time | Maximum exotherm, °F. | Barcol hardness |
|---|---|---|---|---|
| Bisphenol A epoxy plus MDA plus butyl glycidyl ether | 48 hours | 64 hours | 82 | 87 |
| Novolac epoxy plus MDA plus butyl glycidyl ether Q | 20 hours | 36 hours | 86 | 86 |
| Bisphenol A epoxy plus MDA plus cresyl glycidyl ether | 18 hours, 20 minutes | 31 hours | 90 | 79 |
| Novolac epoxy plus MDA plus cresyl glycidyl ether | 15 hours 10 minutes | 31 hours | 85 | 82 |
| Bisphenol A epoxy plus MDA plus epichlorohydrin | 12 hours 10 minutes | 26 hours | 82 | 83 |
| Novolac epoxy plus MDA plus epichlorohydrin | 10 hours | 24 hours | 82 | 87 |
| Bisphenol A epoxy plus MDA plus propylene oxide | 22 hours | 38 hours | 88 | 83 |
| Novolac epoxy plus MDA plus propylene oxide | 19 hours | 43 hours | 82 | 87 |
| Bisphenol A epoxy plus MDA plus styrene oxide | 24 hours | 30 hours | 79 | 80 |
| Novolac epoxy plus MDA plus styrene oxide | 20 hours | 28 hours 30 minutes | 78 | 81 |
| Bisphenol A epoxy plus MDA plus cashew epoxy diluent | 1 hour, 40 minutes | 2 hours, 20 minutes | 215 | 51 |
| Novolac epoxy plus MDA plus cashew epoxy diluent | 1 hour, 4 minutes | 1 hour, 18 minutes | 225 | 45 |
| Bisphenol A epoxy plus MDA plus methyl isobutyl ketone | 48 hours | 64 hours | 82 | 86 |
| Novolac epoxy plus MDA plus methyl isobutyl ketone | 22 hours | 36 hours | 84 | 86 |
| Bisphenol A epoxy plus MDA plus isopropyl alcohol | 10 hours, 40 minutes | 29 hours | 90 | 87 |
| Novolac epoxy plus MDA plus isopropyl alcohol | 8 hours | 22 hours | 92 | 86 |
| Bisphenol A epoxy plus MDA plus furfuryl alcohol | 3 hours, 50 minutes | 6 hours, 30 minutes | 122 | 86 |
| Novolac epoxy plus MDA plus furfuryl alcohol | 1 hour, 40 minutes | 2 hours | 182 | 85 |
| Bisphenol A epoxy plus MDA plus benzyl alcohol | 6 hours, 30 minutes | 18 hours | 97 | 73 |
| Novolac epoxy plus MDA plus benzyl alcohol | 4 hours, 30 minutes | 10 hours, 15 minutes | 100 | 74 |

EXAMPLE IX

The following composition was prepared to exemplify application of the invention to a solid epoxy resin and solid amine hardener system. An epichlorohydrin-bisphenyl A-Type solid epoxy having the approximate melting point of 70° C. and an epoxide equivalent of 500 was dissolved in the solvent-modifier for the hardener to prepare a liquid component.

The solid amine hardener was then introduced into this component followed by five minutes of thorough mixing. One 10 mil film of this composition and the liquid component alone, acting as a control, were cast on glass plate and their hardness determined employing a Barcol Impressor No. 935.

FORMULATION

Solution
  Solid epoxy resin—75 parts
  Acetone—25 parts

Hardener
  Methylene dianiline—16 parts

FORMULATION

| Readings | Control solution |
|---|---|---|
| 6 day cure at R.T. | 85 | Soft film. |
| 9 day cure at R.T. | 87 | Do. |
| 1 month cure at R.T. | 95 | Do. |

The epoxy-hardener composition cured to a hard film, while the epoxy solution control casting remained soft and unmeasurable.

EXAMPLE X

The chemical resistance of a two-component solid aromatic amine cured epoxy system was compared to a conventional three-component aliphatic primary amine cured epoxy system. This comparison was conducted according to procedure described in Example VII. The epoxide resin employed was the same as given in Example I.

FORMULATION

Two-component system

Powder:
  Silica aggregate—12.0%
  Sand—79.5%
  Fine silica filler—5.0%
  Methylene dianiline—3.5%

Liquid:
  Epoxy—74.5%
  Furfuryl alcohol—15.3%
  Epoxy pigmented paste—10.2%

Mixing ratio: 6 parts powder to 1 part liquid by weight.

Three-component system

Resin Component A:
  Epoxy—92.0%
  Diluent—4.7%
  Pigment—3.3%

Hardener Component B:
  Diethylene triamine—100%

Filler Component C:
  Aggregate—10%
  Sand—66.9%
  Fine silica filler—23.1%

Mixing ratio: 12.5 parts "A" to 1 part "B" to 78.1 parts "C," by weight.

Conditioning test specimens: Cure for 7 days at ±5° F.
Compression strength after conditioning period:
  2-component system—10,446 p.s.i.
  3-component system—12,000 p.s.i.

SIX MONTHS CHEMICAL IMMERSION AT R.T.

| Chemical | Compression strength, p.s.i. | Percent change in compression strength | Compression strength, p.s.i. | Percent change in compression strength |
|---|---|---|---|---|
| Trichloroethylene | 5,478 | −47.6 | | Fell apart within two weeks immersion. |
| Glacial acetic acid | 8,599 | −17.7 | | |
| 85% lactic acid | 9,300 | −11.0 | | |

Specimens showed no sign of chemical attack after six months total immersion. Each solution was replaced once a month.

The amine hardeners or curing agents used in conjunction with this invention are, as specified above, of the type normally used only for higher temperature curing and are characterized by the fact that they are solids at room temperature. This gives rise to certain possibilities in the components of the mix as supplied to the customer. For example, by incorporating the liquid modifier with the resinous epoxide, it is possible to produce a liquid-powder two-component mix in which the resinous epoxide-modifier is the liquid and the hardener is powder. If it is desired, as is conventional, to provide a filler in the system, this may readily be provided in dry form in a mixture with the powder hardener.

Alternatively, the modifier may be incorporated directly with the curing agent or curing agent-filler to provide a liquid-liquid, two-component mix. Additionally, paste-paste mixes may be provided of various combinations as may be desired. When the hardener is provided in powder form, it is preferred that the same be pulverized in order to expedite the curing process.

The amount and type of filler in the composition and ratio of filler to resin solution may vary depending upon the use to which the product is to be put and the particular wear it is required to resist. A secondary function of fillers, aggregates, reinforcements, herein referred to as fillers, is to moderate the speed of reaction by absorbing some of the exothermic heat given off by the mechanism of the system. Fillers employed in such compositions may be inert, neutral or slightly basic in nature.

The curing agent is present in the mixtures according to this invention in stoichiometric or substantially stoichiometric amount whereas the amount of solvent-modifier present may range between about 1% to about 50% by weight of the resinous epoxide. For most applications, the range of about 10% to 30% is preferred. To realize the full potential of the curing agent-modifier combination, experience shows that the solvent-modifier should be present in the amount of about 20% by weight based upon the resinous epoxide. In amounts greater than about 30% by weight of solvent-modifier based upon the resinous epoxide, noticeable plasticizing effect on the cross-linked resin is present, to the detriment of the physical properties of the resin particularly as regards its compressive strength but at the same time imparting increased flexibility to the product. These criteria hold true both for the reactive and the nonreactive solvent-modifiers. Thus, an amount of solvent-modifier sufficient to effect room temperature cure in association with the otherwise ineffective polyfunctional organic solid amine high temperature curing agent will be between about 10% to about 30% by weight based upon the resinous epoxide.

Obviously, many modifications and variations of the present invention are possible in the light of the above teachings. It is therefore to be understood that within the scope of the appended claims the invention may be practiced otherwise than as specifically described.

What is claimed is:

1. The method of preparing a cross-linked epoxide resin having a high degree of chemical resistance which comprises:
   (a) forming a mixture of:
   (1) a resinous epoxide,
   (2) a substantially stoichiometric amount of polyfunctional amine high temperature curing agent for the resinous epoxide which is insufficiently reactive with the resinous epoxide at room temperature to cause cross-linking of the resinous epoxide in any significant degree, and
   (3) a solvent for the curing agent in amount of about 1% to about 50% of the resinous epoxide capable of rendering the mixture curable at room temperature to a hard, set and cross-linked mass; and (b) curing said mixture at room temperature to a hard, set and cross-linked mass.

2. The method according to claim 1 wherein the curing agent is of cyclic structure containing at least two nitrogen atoms having reactive hydrogen atoms in which the nitrogen atoms are attached to carbon atoms of the cyclic structure.

3. The method according to claim 2 wherein said solvent is a petroleum hydrocarbon.

4. The method according to claim 2 wherein said solvent possesses a reactive group which is hydroxyl.

5. The method according to claim 2 wherein said solvent possesses a reactive group which is epoxide.

6. The method according to claim 2 wherein said solvent possesses a reactive group which is ether.

7. The method according to claim 2 wherein said solvent possesses a reactive group which is ketone.

8. The method according to claim 1 wherein said solvent is a petroleum hydrocarbon.

9. The method according to claim 1 wherein said solvent possesses a reactive group which is hydroxyl.

10. The method according to claim 1 wherein said solvent possesses a reactive group which is epoxide.

11. The method according to claim 1 wherein said solvent possesses a reactive group which is ether.

12. The method according to claim 1 wherein said solvent possesses a reactive group which is ketone.

13. The method according to claim 1 wherein said solvent is furfuryl alcohol.

14. The method according to claim 1 wherein said solvent is tetrahydrofurfuryl alcohol.

15. The method according to claim 1 wherein said solvent is furfuryl alcohol polymer.

16. The method according to claim 1 wherein said solvent is butyl glycidyl ether.

17. The method according to claim 1 wherein said solvent is cresyl glycidyl ether.

18. The method according to claim 1 wherein said solvent is epichlorohydrin.

19. The method according to claim 1 wherein said solvent is propylene oxide.

20. The method according to claim 1 wherein said solvent is styrene oxide.

21. The method according to claim 1 wherein said solvent is isobutyl ketone.

22. The method according to claim 1 wherein said solvent is isopropyl alcohol.

23. The method according to claim 1 wherein said solvent is benzyl alcohol.

24. The method according to claim 1 wherein said solvent is acetone.

25. The method as defined in claim 1 wherein the solvent is present in an amount of about 20% by weight of the resinous epoxide.

References Cited

UNITED STATES PATENTS 2,801,229   7/1957   De Hoff et al. ____ 260—47 EP

OTHER REFERENCES

Lee et al.: (1957), Epoxy Resins, Their Applications and Technology, McGraw-Hill Book Co., Inc., 1957, pp. 141–144.

Lee et al.: Handbook of Epoxy Resins, McGraw-Hill Book Co., Inc., 1967, pp. 8–2, 8–3, 8–6, 8–7, 13–2, 15–15.

LEWIS T. JACOBS, Primary Examiner

U.S. Cl. X.R.

260—32.8 EP, 33.2 EP, 33.4 EP, 33.6 EP